Aug. 25, 1964  G. F. QUITTNER  3,146,395
MAGNETIC FLAW DETECTION APPARATUS WITH EXCITATION AND
SENSING COILS MOUNTED ON NUTATING HEAD
Filed Feb. 23, 1962

270°

0°

90°

180°

INVENTOR.
GEORGE F. QUITTNER
BY
Richard Mac Cutcheon
ATTORNEY.

United States Patent Office 3,146,395
Patented Aug. 25, 1964

3,146,395
MAGNETIC FLAW DETECTION APPARATUS WITH EXCITATION AND SENSING COILS MOUNTED ON NUTATING HEAD
George F. Quittner, Cleveland Heights, Ohio, assignor to Assembly Products, Inc., Chesterland, Ohio, a corporation of Ohio
Filed Feb. 23, 1962, Ser. No. 175,048
6 Claims. (Cl. 324—37)

The present invention relates to improvements in equipment and processes for the non-destructive testing of metallic materials, and has particular significance in connection with the testing of rods, wires, tubing and other shapes having a round cross section and an axial length greater than the diameter of the cross section.

The problem of finding seams, laps, butt welds, and the like, in samples of the shapes mentioned and which run in a generally axial direction has heretofore given rise to much work and to more than a few inventions. Without detailing all of the past approaches, it can be stated that some success has been achieved with sample-contacting methods, whether these depend on ultrasonics, eddy currents, static magnetic field distortion detection, or other techniques. Heretofore, however, one difficulty associated with any contact method has been due to the fact that an irrelevant but seam-like signal is generated by any inconstancy in contact due to a trivial surface irregularity which is magnified by the basic nature of the physically rubbing contact. Another disadvantage of any contact method is associated with wear of the pickup means, and abrasion of the sample surface has also occurred in the past.

For finding axial and paraxial defects in samples of non-ferro magnetic but conductive material of relatively extended length and passing an inspection station, many eddy current systems which do not make contact with sample have been known in the past. Such systems are useful in finding short discontinuities, and are in wide industrial use. Differential schemes may be employed to make these eddy current systems disregard sources of drift and other relatively long term signals. But by their very design and nature, differential eddy current sensing systems have heretofore appeared to be blind to seams and laps which are relatively extended, and either start and stop gradually or extend the entire length of the sample.

It is true that an absolute eddy current system, when sequentially presented with two sections (of the same sample) only one of which has a seam, will give different readings. But the practical value of this is small, since other changes in material can produce similar signals from continuously run production samples of which none may be defective.

In flaw finding equipment it is also often very important to be able to distinguish between various kinds of seams, and a defect in many flaw finding equipments has been that a deep seam which happens to be positioned in a certain manner will give a signal substantially the same as that given by a shallow one. Such a result is serious because not all seams are equally detrimental to the material being inspected, and it is often prohibitively expensive to reject, discard or rework material having defects less serious than an allowable degree.

Another desideratum is a system capable of finding long seams and equally capable of finding shorter defects. With or without contact-with-sample, with high production linear sample speeds, scanning methods which for sensitivity examine only a small surface area per pass cannot be operated rapidly enough for inspected area helices to adjoin or overlap so as to assure that no part of the surface has been missed.

It is an object of the present invention to provide simple means for overcoming the above mentioned difficulties.

It is another object of the invention to provide non-contact differential inspection apparatus capable of identifying relatively extended flaws, and flaws which have relatively tapered terminations, as well as short flaws and abruptly terminated flaws.

Another object is to provide apparatus and methods capable of discriminating between flaws of various depths and seriousness.

Other objects and advantages will become apparent and the invention may be better understood from consideration of the following description taken in connection with the accompanying drawing, in which.

Figure 1:
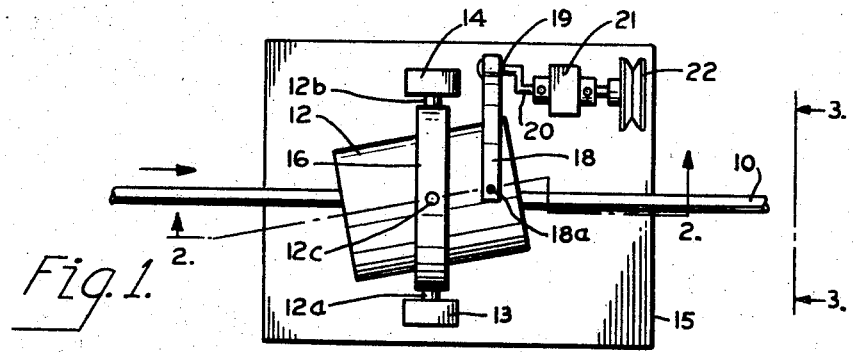
FIG. 1 is a diagrammatic top view of apparatus according to the invention.
Figure 3A:
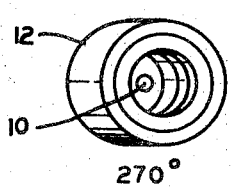
Figure 3B:
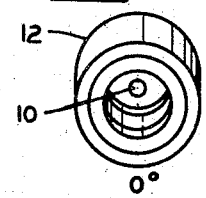
Figure 4:
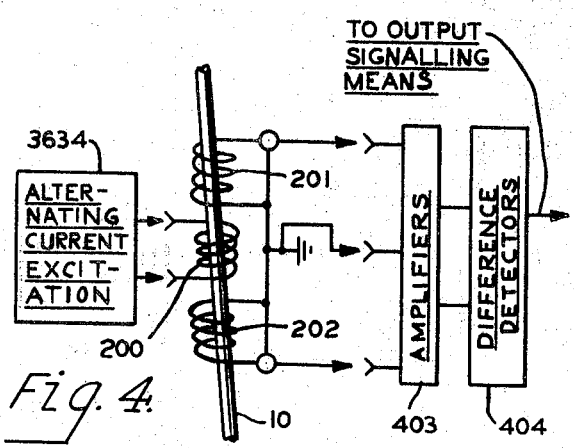
Figure 5:
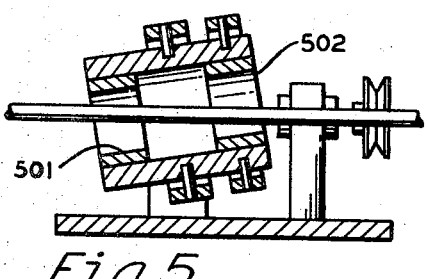

FIGS. 3A, B, C and D are a series of views of one end of the testing head as viewed in the direction of the arrows 3—3 in FIG. 1, that is, as seen along the axis of the sample and showing head motion;

FIG. 4 is a schematic representation of a preferred arrangement for electrically connecting coils of the testing head 12 of FIG. 1; and FIG. 5 shows a modification where the nutating head is equipped for use with capacitive, rather than electromagnetic, sensing means.

Figure 2:
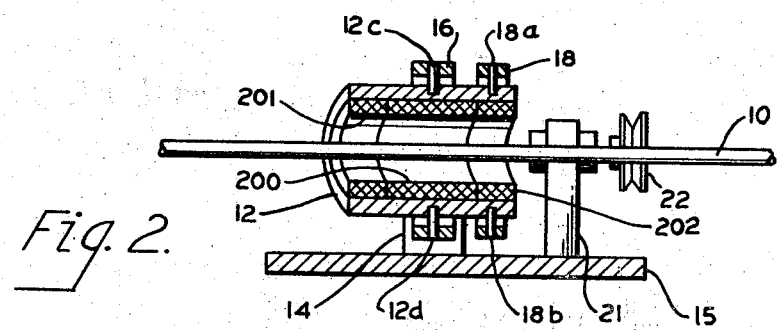
FIG. 2 is a sectional elevation along the line 2—2 of FIG. 1.

Referring first to FIGS. 1 and 2, a circular cross section sample 10, normally moved axially and prevented from radial motion by conventional guiding means (not shown) passes through the general center of a hollow cylindrical testing head 12. The testing head is mounted for swiveled symmetrical motion within horizontal and vertical gimbal axles 12a and 12b and 12c and 12d, respectively, with the gimbal arrangement supported by posts 13 and 14 on a mounting base 15. In the particular embodiment selected for illustration, the testing head 12 is mounted on axles 12c and 12d within a ring 16 which is in turn supported by axles 12a and 12b in posts 13 and 14.

A drive yoke 18 swivels at an asymmetric head location on axles 18a and 18b. Yoke 18 is driven through a ball joint 19 by a crank 20 journalled in a post 21 and rotated by means of a pulley 22 as by a motor driven belt (not shown). Preferably, the motion of yoke 18 is kept as closely as possible parallel to a plane containing the four head mounting axles 12a–d, as can be done by suitable selection of the position of ball joint 19 along the extension of the crank arm 20.

As indicated in FIGS. 2 and 4, excitation and sensing means are symmetrically mounted around the axis of head 12 and around its axially extending hole through which the sample material 10 is passed. For eddy current inspection, excitation coil means 200 may be mounted coaxially between two sensing coils 201 and 202.

As seen in FIG. 5, for capacitance sensing, tubular capacitive electrodes 501 and 502 are spaced symmetrically along the head axis and may be used both for excitation and for sensing as fully illustrated and described in my co-pending application S.N. 122,748, filed July 10, 1961, and assigned to the assignee of the present invention.

The present invention may be better understood from consideration of the various parts of FIG. 3 where, looking along the constant sample 10 axis, the important effects of motion of the nutating head 12 are illustrated. In FIG. 3B, for example, a 0°, a top-most point of the inner circumference of the head and nearest to the viewer is in close proximity to the top-most side of the sample 10. At the same time, a bottom-most point of the inner circumference of the head end farthest from the viewer is in equally close proximity to the bottom-most side of the sample.

Figure 3C:
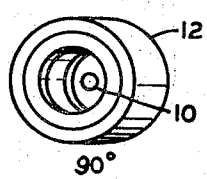
Figure 3D:
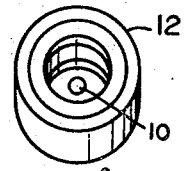

When the crank 20 (of FIGS. 1 and 2) has rotated 90 angular degrees, it is seen from FIG. 3C that the head-with-respect-to-sample-proximity positions are 90° advanced around the sample. Similarly, at 180° (FIG. 3D) and 270° (FIG. 3A) new proximity positions result. By accurate sample centering and head construction symmetry, at all crank positions, coils 201 and 202 (or electrodes 501 and 502) are in equally balanced eccentric positions with respect to the sample, both mechanically and electrically.

In the presence of a surface flaw running along the length of the sample, the electrical balance will, however, be disturbed twice in each crank revolution, once as the leading sensing coil or capacitive electrode is in close proximity to it, and again as the trailing coil or electrode is in close proximity to it. By contrast with some prior surface scanning techniques, for example, where helical paths are traced around a sample, a short defect can be found by the present invention because it is contemplated that the sensitivity of the apparatus is adjusted such as to be responsive to faults encountered even if the nearest head portion is then at a position most remote from sample. Thus, a short defect is found in almost the same way that it would be by a non-nutating head.

Although I do not wish to be limited by the following theory, it may be that the reason an arrangement according to the invention is operative in eddy current applications is that with the axial hole of a sensing coil having an I.D. substantially larger than the O.D. of a circular cross section sample having eddy currents present non-concentrically with respect to sensing coil, the coil is better coupled to that portion of the sample which is closest. Similarly, in the case of capacitive electrodes, in accordance with the well known relation $$C = \frac{eA}{d}$$

where $e$ is the dielectric constant of the intervening medium, $A$ the areas involved and $d$ the distance between plates, the decrease of "$d$" results in increase of capacitance "$C$" which, of course, results in lowering the impedance of the respective capacitive bridge leg.

Detailed circuits for apparatus useful to energize a magnetic or conductive material sample to find flaws therein are fully disclosed in my co-pending patent applications S.N. 82,348, filed January 12, 1961; S.N. 94,472, filed March 9, 1961; S.N. 122,748, filed July 10, 1961; and S.N. 159,553, filed December 15, 1961, all assigned to the assignee of the present invention. In connection with the present invention, the block diagram of FIG. 4 is accordingly used to show a general circuit arrangement preferred for eddy current application. In FIG. 4, 3634 represents a module or other device for providing A.C. excitation for exciting coil 200. From coils 201 and 202, two independent inphase signals are derived from the respective sensing coils and, together with a common grounded lead, brought to independent input amplifiers as represented at the block or module 403 and where the signal levels are increased and also, usually, adjusted for amplitude equality for a steady state condition. The difference between the two signals is detected by suitable means as indicated by the block or module 404 and a resultant different signal is used to energize final output signal means, not shown, or control a flaw indicating paint sprayer, flaw material reject shearing operation, or whatever. In the capacitive embodiments, as fully disclosed in the above mentioned co-pending application S.N. 122,-748, a bridge circuit is used to produce two inphase signals from the bridge arms which can be sensed by cathode follower amplifiers located in the pickup head and delivered via a cable to the same interpretation equipment as described above and shown in block form in connection with the present application FIG. 4.

As used in the present specification and claims, the words "nutation" and "nutating" refer to "nod" of 'head,' the closest adjacency of head and sample advancing rotatively with respect to sample, there being a rotative fashion variation of tilt and/or position of a usually non-rotating part. Since the present application has its basis in my invention or discovery that with sample off-center with respect to a sample surrounding pickup element and/or field generating means (or both included in one element) an advantageously different coupling relationship obtains, it follows that practice of the invention may not require a differential (two pickup and output difference detector) system, and what I refer to as an absolute system (reading out the output of a single sensing means) might be used instead, for with nutation (i.e., adjacency effect proceeding around sample because the pickup which surrounds the sample has an axis inclined to, and preferably intersecting, the axis of sample) the one end of even a single pickup coil is going to be most sensitive to a flaw, located at, say, 90 angular degrees, at a different time than the opposite end of the coil will be most sensitive to it to cause a double envelope modulation in the output signal due to a combination of rotative adjacency advancement and relatively generally linear movement between sample and head (though the latter may be of no moment in the case of axially long flaws except as their terminations are encountered). Even non-parallelism of sample axis with respect to pickup axis may not be required. Suppose a single coil pickup is used and its axis is non-coincident with but parallel to sample axis and, in effect, the axis of the one is rotated about the axis of the other. This perhaps does not amount to nutation, but here there would be no reason for using two pickup elements, except for the advantage that one may encounter a defect sooner than the other because of the relative linear movement of sample with respect to head, but with either a differential system or an absolute system, and even with this new factor that adjacency (of pickup to sample) is simultaneously the same at both ends of even a single pickup element, there is again a balanced condition (equal output) at all points except when a flaw is found, and the system may be operative and within the present invention although, as of the present, it is not preferred.

Many combinations of the present invention with known techniques will be evident to those skilled in the art, and while I have described particular embodiments, various modifications may obviously be made without departing from the true spirit and scope of the invention which I intend to have defined only by the accompanying claims taken with all reasonable equivalents.

I claim:

1. In apparatus for detecting a flaw in a sample with relative movement between the apparatus and an extended length of sample, the combination of:
   (a) field excitation means comprising at least one hollow element surrounding the sample,
   (b) means for sensing the field excitation as affected by the sample and comprising at least one hollow electrical condition pickup element completely surrounding the sample while non-coaxial therewith, and
   (c) a mechanical movement for changing the orientation of said sensing means with respect to the sample whereby the points of closest adjacency between the sensing element and the sample move rotatively about the sample.

2. The combination of claim 1 further characterized by the sensing means comprising a pair of hollow cylindrical electrical condition pickup elements each surrounding the sample, each with an inner diameter substantially greater than the sample outer diameter.

3. The combination of claim 2 further characterized by the excitation means including a coil contained coaxially between the pickup elements and forming therewith a head which is tilted with respect to sample so that the sensing element at one end of the head has its outermost end closest to one radial portion of the sample and the sensing element at the opposite end of the head has its outermost end adjacent a diametrically opposite though axially displaced portion of the sample, while the driven movement includes a linkage for nutating said head whereby the points of closest adjacency between the sensing element and the sample move rotatively about the sample.

4. The combination of claim 2 further characterized by the excitation means comprising a coil and means for energizing the coil for establishing eddy currents within the sample, and the pickup elements comprising a pair of coils one at each end of the excitation coil, and an amplifier and difference detection means sequentially arranged to be responsive to the difference of the outputs from the sensing coils.

5. The combination of claim 1 further characterized by the sensing means having at least one pickup element and the mechanical movement comprising a crank means for nutating said pickup element whereby to move portions of the pickup element around the sample axis with the pickup axis intersecting the sample axis and whereby the locus of any point on pickup axis and a predetermined distance from the intersection of the pickup axis and the sample axis will be a circle substantially concentric with the sample axis.

6. The combination of claim 1 further characterized by the sample having a longitudinal axis and the sensing means having two pickup elements which are coaxial about an axis which intersects the sample axis.

References Cited in the file of this patent

UNITED STATES PATENTS 1,910,770    Kinsley                May 23, 1933

FOREIGN PATENTS 594,158    Great Britain            Nov. 4, 1947